(12) United States Patent
Okada et al.

(10) Patent No.: US 7,022,766 B2
(45) Date of Patent: Apr. 4, 2006

(54) OLEFIN BLOCK COPOLYMER, VISCOSITY INDEX IMPROVER FOR LUBRICATING OILS AND LUBRICATING OIL COMPOSITION

(75) Inventors: Keiji Okada, Sodegaura (JP); Shigenobu Ikenaga, Sodegaura (JP); Ryousuke Kaneshige, Ichihara (JP); Tomoaki Matsugi, Sodegaura (JP); Shinichi Kojoh, Sodegaura (JP); Terunori Fujita, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 21 days.

(21) Appl. No.: 10/721,107

(22) Filed: Nov. 26, 2003

(65) Prior Publication Data

US 2004/0121922 A1    Jun. 24, 2004

Related U.S. Application Data

(63) Continuation-in-part of application No. 10/157,872, filed on May 31, 2002, now abandoned.

(30) Foreign Application Priority Data

May 31, 2001 (JP) ............................. 2001-165448

(51) Int. Cl.
```
C08F 255/04      (2006.01)
C08F 210/02      (2006.01)
C08F 210/06      (2006.01)
C10M 107/04      (2006.01)
```
(52) U.S. Cl. ................. 525/98; 525/242; 525/244; 525/314; 525/315; 525/323; 526/348; 508/591

(58) Field of Classification Search ................. 525/98, 525/242, 244, 314, 315, 323, 316; 508/591; 526/348
See application file for complete search history.

(56) References Cited

U.S. PATENT DOCUMENTS

| | | | |
|---|---|---|---|
| 3,697,429 A | 10/1972 | Engel et al. | |
| 4,621,114 A | 11/1986 | Watanabe | |
| 4,804,794 A | 2/1989 | Ver Strate et al. | |
| 4,959,436 A | 9/1990 | Cozewith et al. | |
| 5,115,030 A | 5/1992 | Tanaka et al. | |
| 5,208,265 A | 5/1993 | de Grave et al. | |

FOREIGN PATENT DOCUMENTS

| | | |
|---|---|---|
| EP | 0 129 414 A2 | 12/1984 |
| EP | 0 299 608 A1 | 1/1989 |
| EP | 1 197 500 A1 | 4/2002 |
| JP | 6-96624 B2 | 11/1994 |
| JP | 2002-507225 A | 3/2002 |
| WO | WO 95/27745 A1 | 10/1995 |
| WO | WO 98/02471 A1 | 1/1998 |
| WO | WO 98/58978 A1 | 12/1998 |

*Primary Examiner*—James J. Seidleck
*Assistant Examiner*—Olga Asinovsky
(74) *Attorney, Agent, or Firm*—Birch, Stewart, Kolasch & Birch, LLP

(57) ABSTRACT

The present invention provides an olefin block copolymer for a viscosity index improver capable of preparing a lubricating oil composition having excellent low temperature properties and excellent balance between viscosity and shear stability, a viscosity index improver and a lubricating oil composition comprising the viscosity index improver.

The olefin block copolymer has a Mw/Mn of not more than 1.5, and comprises:

(i) a polymer block comprising ethylene and an α-olefin of 3 to 20 carbon atoms, having a molar ratio (ethylene/α-olefin) of ethylene units to α-olefin units of from 20/80 to 65/35, a Mw of 50,000 to 2,000,000, and having a slope of an intramolecular composition distribution of absolute value of 0.1 to 0, and (ii) a polymer block comprising ethylene and an α-olefin of 3 to 20 carbon atoms, having a molar ratio (ethylene/α-olefin) of ethylene units to α-olefin units of from 70/30 to 85/15, a Mw of 10,000 to 400,000, and having a slope of an intramolecular composition distribution of absolute value of 0.1 to 0.

3 Claims, 1 Drawing Sheet

OLEFIN BLOCK COPOLYMER, VISCOSITY INDEX IMPROVER FOR LUBRICATING OILS AND LUBRICATING OIL COMPOSITION

RELATED APPLICATION

This application is a continuation-in-part application of the U.S. patent application Ser. No. 10/157,872 filed on May 31, 2002.

FIELD OF THE INVENTION

The present invention relates to a novel olefin block copolymer and uses thereof. More particularly, the present invention relates to an olefin block copolymer having specific polymer blocks each obtained from ethylene and an α-olefin, a viscosity index improver for lubricating oils comprising the olefin block copolymer and a lubricating oil composition containing the viscosity index improver for lubricating oils.

BACKGROUND OF THE INVENTION

The viscosity of petroleum products generally varies drastically with temperature, that is, the viscosity has temperature dependency. When a lubricating oil is used for, for example, automobiles, the viscosity of the lubricating oil ideally has small temperature dependency. Therefore, to reduce the temperature dependency of the viscosity, lubricating oils contain a viscosity index improver, which is a specific polymer soluble in a lubricating oil base. Ethylene/α-olefin copolymers have been widely used in recent years as the viscosity index improver and modified in various ways to further improve the balance between properties of the lubricating oils.

The viscosity index improver is generally used to prevent a lowering of the lubricating oil viscosity at high temperatures. However in recent years, there has been a demand for a viscosity index improver that can suppress a rise of the lubricating oil viscosity at low temperatures (which means imparting excellent low temperature properties to the lubricating oil). Lubricating oil compositions are used for applications where a shear force is applied and therefore need to have a quality ensuring excellent shear stability. To improve the shear stability, a low-molecular weight polymer is generally used. However, as the molecular weight lowers, the viscosity index improver has to be added in a large amount to reach a viscosity that a lubricating oil needs to have, with the result that the economical efficiency is worsened. On the other hand, the shear stability is deteriorated when the viscosity index improver is added in a reduced amount with an increased molecular weight in an attempt to improve the economical efficiency of the lubricating oil.

The polymers used for lubricating oils are known to be better when they have a narrower molecular weight distribution. A representative advantage of such polymers is that the shear stability is good in comparison with other polymers having a broader molecular weight distribution. As such, various catalysts are now studied to narrow the molecular weight distribution of the polymers. Proposed catalysts include a catalyst supported on a highly active magnesium chloride, a metallocene catalyst and a vanadium catalyst. JP-A-60(1985)/35009 discloses a polymer having Mw/Mn of 1.2, which is obtained using these catalysts.

U.S. Pat. No. 3,697,429 discloses a blend of ethylene/α-olefin copolymers having different ethylene contents. It is described that a lubricating oil having suitable low temperature properties can be obtained when this blend is used as a viscosity index improver for lubricating oils. However, such a lubricating oil is insufficient in the balance of properties.

Meanwhile, other inventions have been made taking advantage of characteristics of the living polymerization. For example, JP-A-60(1985)/35009 discloses a random copolymer and a block copolymer each composed of ethylene and an α-olefin, in which the molecular weight distribution and the composition distribution are narrow and the composition differs in the molecule. It is also described that these copolymers are suitable as a viscosity index improver for lubricating oils because they have good shear stability and viscosity-increasing properties and excellent low temperature properties, which are essential to the applications of the lubricating oil. In particular, it is also mentioned that a block copolymer having segments of different compositions in the same molecule is more preferable. The use of a tubular reactor is disclosed as a method for continuously obtaining a polymer having a narrow molecular weight distribution in the presence of a catalyst enabling living polymerization. When a copolymer is produced in a tubular reactor, the monomer composition changes in the reactor because the monomers have different reactivity to yield a tapered copolymer in which the composition gradually differs in the polymer chain, giving a broad intramolecular composition distribution. Although the polymers disclosed in the above literature are suitable as a viscosity index improver for lubricating oils, the polymer described in detail in the same literature that has a molecular weight distribution (Mw/Mn) of as narrow as 1.2 does not have sufficient capabilities to improve low temperature properties and is requested for further improvement. As a method to impart the capabilities of improving low temperature properties, it is known to allow the polymer to contain ethylene in an amount as large as possible within the range not extremely detrimental to the low temperature properties. This method, however, has a problem that the intramolecular composition distribution in a tapered copolymer is so broadened that it is difficult to avoid such a detrimental range.

Furthermore, WO98/58978 (National Publication of International Patent 2002-507225) discloses a viscosity index improver for lubricating oils comprising an olefin block copolymer. One block of the above-disclosed olefin block copolymer comprises ethylene of about 93% by weight and this viscosity index improver for lubricating oils is still insufficient to improve low temperature properties.

OBJECT OF THE INVENTION

The present invention has been made for the purpose of solving the above problems related to the prior art, and has an object of providing an olefin block copolymer having specific polymer blocks, a viscosity index improver for lubricating oils that can give a lubricating oil composition having excellent low temperature properties and well-balanced viscosity and shear stability, and a lubricating oil composition containing the viscosity index improver for lubricating oils.

SUMMARY OF THE INVENTION

The olefin block copolymer of the invention comprises;
(i) a polymer block that is obtained from ethylene and an α-olefin of 3 to 20 carbon atoms, and has a molar ratio (ethylene/α-olefin) of ethylene units to α-olefin units of 20/80 to 65/35 and a weight-average molecular weight of 50,000 to 2,000,000, and has a slope of an intramolecular composition distribution of absolute value of 0.1 to 0, and (ii) a polymer block that is obtained from ethylene and an α-olefin of 3 to 20 carbon atoms, and has a molar ratio (ethylene/α-olefin) of ethylene units to α-olefin units of 70/30 to 85/15 and a weight-average molecular weight of 10,000 to 400,000, and has a slope of an intramolecular composition distribution of absolute value of 0.1 to 0, and has Mw/Mn (Mw: weight-average molecular weight, Mn: number-average molecular weight) of not more than 1.5.

The viscosity index improver for lubricating oils of the invention comprises the olefin block copolymer.

The lubricating oil composition of the invention contains the viscosity index improver for lubricating oils.

DETAILED DESCRIPTION OF THE INVENTION

Figure 1:
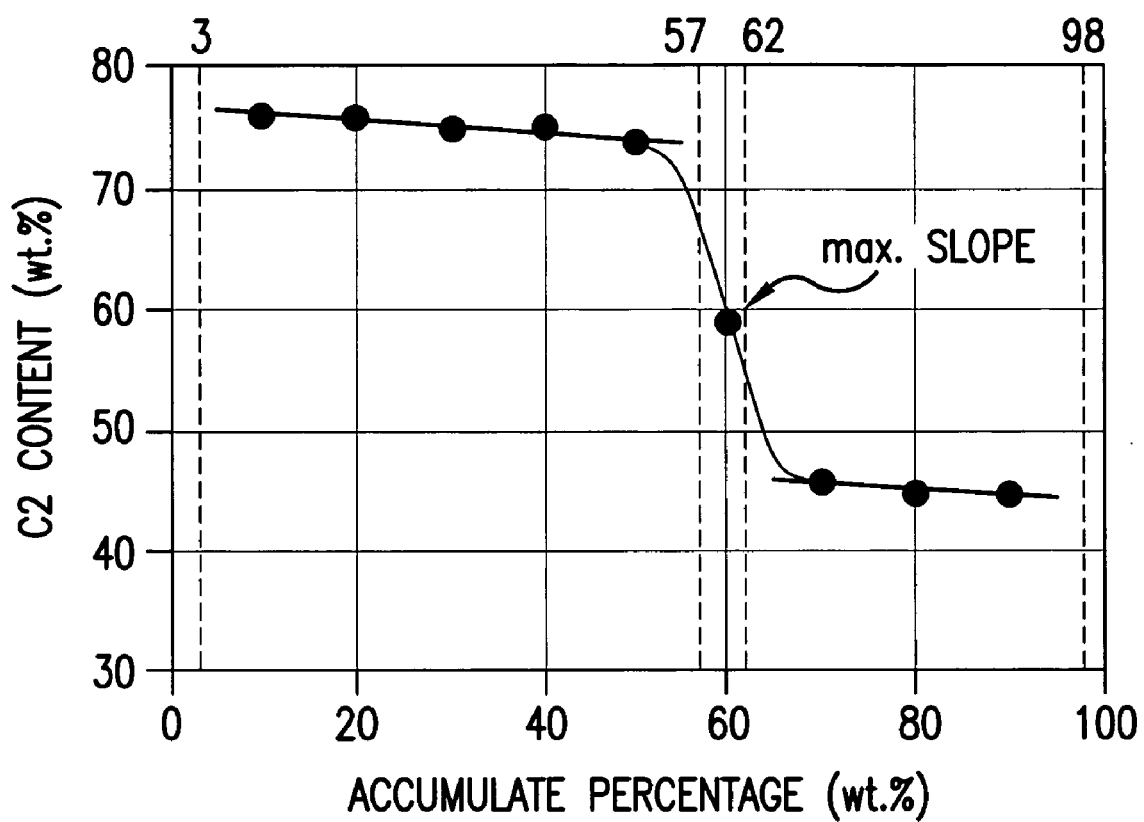
FIG. 1 is a graph showing a method to determine a slope of an intramolecular composition distribution of a polymer having two blocks.

The olefin block copolymer, the viscosity index improver for lubricating oils and the lubricating oil composition of the invention are described in detail hereinafter.

The terminology "polymerization" is used to refer not only to homopolymerization but sometimes to copolymerization. The terminology "polymer" is used to refer not only to homopolymer but sometimes to copolymer.

The olefin block copolymer of the invention is an olefin block copolymer comprising;

(i) a polymer block obtained from ethylene and an α-olefin of 3 to 20 carbon atoms and containing ethylene in a relatively small amount, and (ii) a polymer block obtained from ethylene and an α-olefin of 3 to 20 carbon atoms and containing ethylene in a relatively large amount.

Examples of the α-olefin of 3 to 20 carbon atoms include linear or branched α-olefins having 3 to 20 carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; and cyclic olefins having 3 to 20 carbon atoms, such as cyclopentene, cycloheptene, norbornene, alkylnorbornene, e.g., 5-methyl-2-norbornene, tetracyclododecene, 2-methyl-1,4,5,8-dimethano-1,2,3,4,4a,5,8,8a-octahydronaphthalene.

These α-olefins may be used either individually or in combination.

The polymer blocks (i) and (ii) are each composed of a random copolymer of ethylene and at least one α-olefin selected from olefins having 3 to 20 carbon atoms.

The polymer block (i) has a molar ratio (ethylene/α-olefin) of ethylene units to α-olefin units of 20/80 to 65/35, preferably 40/60 to 64/36, and a weight-average molecular weight of 50,000 to 2,000,000, preferably 60,000 to 1,000,000, more preferably 80,000 to 500,000

The polymer block (ii) has a molar ratio (ethylene/α-olefin) of ethylene units to α-olefin units of 70/30 to 85/15, preferably 73/27 to 82/18, and a weight-average molecular weight of 10,000 to 400,000, preferably 20,000 to 200,000, more preferably 30,000 to 150,000.

The polymer blocks (i) and (ii) have a slope of an intramolecular composition distribution of absolute value of 0.1 to 0, preferably 0.10 to 0, more preferably 0.07 to 0, most preferably 0.05 to 0, respectively.

When the ethylene/α-olefin molar ratios, the weight-average molecular weights and the slopes of the intramolecular composition distribution of the polymer block (i) and the polymer block (ii) are in the above ranges, obtained is a viscosity index improver that enables producing a lubricating oil composition particularly excellent in low temperature properties and in shear stability.

The molar ratio of ethylene units to α-olefin units can be set in the above ranges by adjustment of a monomer ratio, and the weight-average molecular weight can be set in the above ranges by adjustment of a polymerization temperature and a polymerization time during the polymerization.

The polymer block (ii) preferably has a weight-average molecular weight smaller than that of the polymer block (i).

The olefin block copolymer may contain one or more polymer block(s) (iii) in addition to the polymer block (i) and the polymer block (ii). In this case, the olefin block copolymer is represented by (i)-(ii)-(iii)n or (ii)-(i)-(iii)n, wherein n denotes an integer of 1 or more, preferably from 1 to 8, more preferably from 1 to 3. Any neighboring polymer blocks are different from each other.

The polymer block (iii) may be composed of a polymer of ethylene and one olefin selected from α-olefins having 3 to 20 carbon atoms, or be composed of a random copolymer of ethylene and at least two olefins selected from α-olefins having 3 to 20 carbon atoms.

The olefin block copolymer may be bonded to other part having a different structure from the above as long as the aforesaid structure is maintained but within the limit not detrimental to the object of the present invention. The copolymer may have been modified by, for example, graft copolymerization.

It is preferred that the olefin block copolymer has a weight-average molecular weight (Mw) of 10,000 or more, especially 20,000 to 2,000,000, more especially 30,000 to 1,000,000, even more especially 40,000 to 500,000, and Mw/Mn (Mw: weight-average molecular weight, Mn: number-average molecular weight) of not more than 1.5, especially not more than 1.35.

The Mw/Mn ratio can be set in the above ranges by use of such a catalyst as described later. For example, the Mw/Mn value can be controlled within the above ranges by selecting a transition metal compound used.

When the weight-average molecular weight is in the above ranges, the viscosity index improver for lubricating oils has excellent viscosity-increasing properties (properties to impart an increased viscosity) to make a small amount of the olefin block copolymer sufficient for attaining a specific lubricating oil viscosity, and enables producing a lubricating oil composition that is hardly gelled at low temperatures and that is excellent in shear stability of the lubricating oil viscosity.

When the Mw/Mn value is in the above ranges, obtained is a viscosity index improver for lubricating oils that enables producing a lubricating oil composition excellent in shear stability.

The weight-average molecular weight (Mw) and the number-average molecular weight (Mn) are in terms of polystyrene and are determined by a gel permeation chromatography (GPC) under the conditions of a temperature of 140° C. and a solvent of orthodichlorobenzene.

The olefin block copolymer of the present invention is preferably a diblock copolymer or a triblock copolymer.

When the olefin block copolymer is a diblock copolymer composed of two polymer blocks, the Mw/Mn ratio is desirably less than 1.35, preferably not more than 1.3, more preferably not more than 1.25. In such a case, obtained is a viscosity index improver that enables producing a lubricating oil composition particularly excellent in shear stability.

When the olefin block copolymer is a diblock copolymer, the polymer blocks are preferably selected from an ethylene/propylene copolymer, an ethylene/butene copolymer, an ethylene/hexene copolymer and an ethylene/octene copolymer. In such a case, obtained is a viscosity index improver that enables producing a lubricating oil composition particularly excellent in low temperature properties and in shear stability.

Pyrolysis of the olefin block copolymer of the invention reveals that the intramolecular composition distribution with respect to the high ethylene-content components (components derived from the polymer block (ii)) and the low ethylene-content components (components derived from the polymer block (i)) provides a slope (CD) that has absolute value of 0.1 to 0, preferably 0.07 to 0, more preferably 0.05 to 0.

To detail the slope (CD) of the intramolecular composition distribution, the larger the value, the broader the intramolecular composition distribution, and the smaller the value, the narrower the intramolecular composition distribution.

The olefin block copolymer having such a slope (CD) of an intramolecular composition distribution can be produced, as is descried later, by copolymerizing ethylene and an α-olefin in multiple stages in the presence of a specific catalyst. The slope can be controlled by altering the transition metal compound used.

(Method of Measuring the Intramolecular Composition Distribution)

The intramolecular composition distribution can be measured by such a method as disclosed in JP-B-6(1994)/96624. Specifically, the original polymer is pyrolyzed to be fragments, and the fragments are fractionated in solvents, a good solvent and a poor solvent according to the composition. The composition is statistically analyzed to determine the intramolecular composition distribution.

For example, the pyrolysis is conducted under such conditions as an atmosphere of nitrogen, a temperature of 330° C. and a duration of 60 minutes. Ideally, the pyrolysis is conducted until the molecular weight of the fragments is reduced to account for about 5% of the molecular weight of the original polymer. The temperature and the duration in the pyrolysis can be varied depending on the molecular weight of the fragments. The pyrolysis temperature is usually 300 to 370° C.

Technologies useful for measuring the composition dispersion in a nonpolar polymer include solvent fractionation in good and poor solvents based on thermodynamics of the phase separation. This technology is described in the thesis entitled "Polymer Fractionation" (Academic (1967), from Page 341 onward, edited by M. Cantow) and the thesis by H. Inagaki et al., in Development in Polymer Characterization vol. 3, No. 1 (1982). For example, a polymer is dissolved in n-hexane at room temperature to prepare 1 g/100 cc of a hexane solution. Dissolution of the polymer can be helped by heating in a hot water bath. Then isopropyl alcohol is added dropwise to the solution until the solution becomes whitely turbid and precipitation can be observed. After removal of the supernatants, the precipitate is dried under vacuum at 120° C. for 8 hours. The dried fraction is measured for the composition by NMR. Dropwise addition to recover and analysis of the fraction are conducted until 100% of the polymer is recovered. The dropwise addition is preferably controlled to recover the polymer in an amount of 5 to 10% per one cycle.

The percentages by weight of ethylene (wt %) are plotted to the accumulated percentages of the polymer recovered to determine the composition distribution, and the slope (CD) is determined from the plotted points that are in the range of 50±45% of the accumulated percentages of the polymer, that is, the range where the polymer occupies 90% by linear approximation using a method of least squares.

That is, from the plotted graph of an ethylene content (wt %) in an ordinate axis and an accumulated percentage (wt %) of the polymer in an abscissa axis, it is obvious that which parts of the polymer are derived from which fragments of the polymer block.

For example, when the plotted graph is as shown in FIG. 1, wherein a polymer block (i) exists in 60 wt % and a polymer block (ii) exists in 40 wt % in the olefin block copolymer, the curved line is drawn to fit the plotted points and the point having a maximum slope in the curved line is determined so that the point can separate the polymer into two regions. In FIG. 1, there exists the point having a maximum slope in the curved line at the accumulated percentage of the polymer of 60 wt %.

Thus, the region is separated into two by the point at the accumulated percentage of the polymer of 60 wt % so that it can be decided that the region of 0–60 wt % is derived from the polymer block (i) and the region of 60–100 wt % is derived from the polymer block (ii).

Namely, a slope of an intramolecular composition distribution of the polymer block (i) is determined from the points in the range of 3 to 57 wt % of the accumulated percentage of the polymer, i.e., in the range of 90% existence of 60 wt % of the polymer block (i).

On the other hand, a slope of an intramolecular composition distribution of the polymer block (ii) is determined from the points in the range of 62 to 98 wt % of the accumulated percentage of the polymer, i.e., in the range of 90% existence of 40 wt % of the polymer block (ii).

The olefin block copolymer of the invention is a block copolymer comprising a polymer block that is composed of an ethylene/α-olefin copolymer having a relatively low ethylene content and a polymer block that is composed of an ethylene/α-olefin copolymer having a relatively high ethylene content.

Such an olefin block copolymer can be distinguished from the tapered polymer disclosed in JP-A-60 (1985)/35009 by measuring the slope of the intramolecular composition distribution by the solvent fractionation, or simply by measuring a DSC curve. When the composition of a polymer is such that the polymer has a melting point, the tapered polymer tends to have a wider half height width of the melting point in comparison with a polymer of the same melting point produced with a continuous autoclave.

The olefin block copolymer of the invention, as is described later, is obtained by first copolymerizing ethylene and an α-olefin to prepare a polymer block, and copolymerizing ethylene and an α-olefin in the presence of the polymer block to prepare a polymer block that is different from the above polymer block.

The polymer, which is produced by blending a high-ethylene content ethylene/α-olefin copolymer and a low-ethylene content ethylene/α-olefin copolymer by any means other than a polymerization reactor, can be discontinuously fractionated into the high-ethylene components and the low-ethylene components by the solvent fractionation without conducting pyrolysis. On the other hand, the olefin block copolymer of the invention can not be discontinuously fractionated by the solvent fractionation without conducting pyrolysis.

(Process for Producing the Olefin Polymer)

The olefin block copolymer of the invention, which is used as a viscosity index improver for lubricating oils, can be obtained by copolymerizing ethylene and at least one olefin selected from olefins of 3 to 20 carbon atoms in the following manner in the presence of an olefin polymerization catalyst comprising a transition metal compound (A), preferably in the presence of an olefin polymerization catalyst comprising the transition metal compound (A) and at least one compound selected from (B) (B-1) an Organometallic Compound,
　(B-2) an organoaluminum oxy-compound, and
　(B-3) a compound that reacts with the transition metal compound (A) to form an ion pair.

(Transition Metal Compound (A))

The transition metal compound, which is used in production of the olefin block copolymer, is a transition metal compound represented by, for example, the following formula (I). Referring to the transition metal compound, it is preferable in the β-agostic structure obtained by a density functional method with respect to a cation complex of a corresponding structure to the transition metal compound of the formula (I) wherein one of Xs is substituted with an n-propyl group, that the distance be not more than 3.0 Å between the β-position hydrogen and a heteroatom that is nearest to the hydrogen and is free of direct bond with the central metal M and that the electrostatic energy be not more than 10 kJ/mol.

The density functional method is a calculation by a BLYP method using the program of ADF 2000.01 (developed by SCM (The Netherlands), available by downloading from the SCM website (html://www.scm.com) after signing a licensing agreement with SCM). The basis function is a Slater-type orbital. To determine the structure, a triple zeta function is used for the central metal and a double zeta function is used for other atoms. To evaluate the electrostatic energy, a polarization function is added to the double zeta function of the other atoms. The basis function is used also in the single-point calculation to determine the optimum structure among the structures obtained from the above structure calculation. Apart from the structure calculation, the electrostatic energy is corrected by Pauli's relativistic potential. The electrostatic energy is an electrostatic energy occurring between the β-position hydrogen and a heteroatom nearest to the hydrogen. More specifically, the electrostatic energy is an electrostatic interaction between the two atoms having an electronic state determined by allotting the electric charge obtained from the complex calculation. The electric charge used herein is an electric population of these two atoms on each orbit of s, p and d, and is obtained from the complex calculation (the single-point calculation for the optimum β-agostic structure determined by the structure calculation).

$$L_mMX_n \quad (I)$$

wherein,

M is a transition metal atom selected from Group 3 to Group 11 of the Periodic Table, m is an integer of 1 to 5, n is a number satisfying the valence of M, L is a ligand coordinated to the central metal M and having a heteroatom free of direct bond with the central metal M, and X is an oxygen atom, a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group, and when n is 2 or more, plural groups indicated by X may be the same or different and the plural groups indicated by X may be bonded to form a ring.

The olefin block copolymer can be prepared in the presence of an olefin polymerization catalyst comprising a transition metal compound represented by the following formula (II-a) or (II-b);

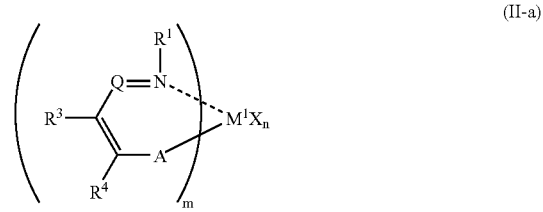

(II-a)

wherein, $M^1$ is a transition metal atom selected from Group 3 to Group 11 of the Periodic Table, m is an integer of 1 to 5, Q is a nitrogen atom, or a carbon atom having a substituent group $R^2$, A is an oxygen atom, a sulfur atom or a selenium atom, or a nitrogen atom having a substituent group $R^5$, $R^1$ is a hydrocarbon group having at least one heteroatom, or a hydrocarbon group having at least one heteroatom-containing group, $R^2$ to $R^5$, which may be the same or different, are each a hydrogen atom, a halogen atom, a hydrocarbon group, a hydrocarbon-substituted silyl group, an oxygen-containing group, a nitrogen-containing group, a sulfur-containing group, a boron-containing group, an aluminum-containing group, a phosphorus-containing group, a halogen-containing group, a heterocyclic compound residue, a silicon-containing group, a germanium-containing group or a tin-containing group, and two or more of $R^2$ to $R^5$ may be bonded to form a ring, and when m is 2 or more, $R^1$s, $R^2$, $R^3$s, $R^4$s and $R^5$s may be the same or different, and one group of $R^2$ to $R^5$ contained in one ligand and one group of $R^2$ to $R^5$ contained in other ligands may be bonded, n is a number satisfying the valence of M, and x is as defined with respect to X of the formula (I) and, when n is 2 or more, plural groups indicated by X may be the same or different, and the plural groups indicated by X may be bonded to form a ring;

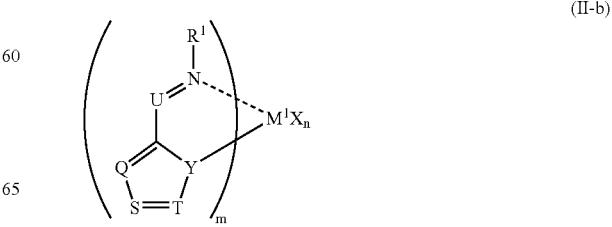

(II-b)

wherein, $M^1$ is a transition metal atom selected from Group 3 to Group 11 of the Periodic Table, m is an integer of 1 to 5, Y is a nitrogen atom or a phosphorus atom, U is a carbon atom having a substituent group $R^6$, a nitrogen atom or a phosphorous atom, Q is a carbon atom having a substituent group $R^7$, a nitrogen atom or a phosphorous atom, S is a carbon atom having a substituent group $R^3$, a nitrogen atom or a phosphorous atom, T is a carbon atom having a substituent group $R^9$, a nitrogen atom or a phosphorous atom, $R^1$ is a hydrocarbon group having at least one heteroatom, or a hydrocarbon group having at least one heteroatom-containing group, $R^6$ to $R^9$, which may be the same or different, are as defined with respect to $R^2$ to $R^5$ of the formula (II-a), and two or more of $R^6$ to $R^9$ may be bonded to form a ring, and when m is 2 or more, $R^1$s, $R^5$s, $R^7$s, $R^8$s and $R^9$s may be the same or different, and one group of $R^6$ to $R^9$ contained in one ligand and one group of $R^6$ to $R^9$ contained in other ligands may be bonded, n is a number satisfying the valence of $M^1$, and X is as defined with respect to X of the formula (I) and, when n is 2 or more, plural groups indicated by X may be the same or different, and the plural groups indicated by X may be bonded to form a ring.

Further, the olefin block copolymer can be prepared in the presence of an olefin polymerization catalyst comprising a transition metal compound represented by the following formula (II-a') or (II-b');

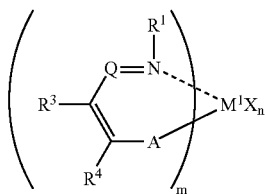

(II-a')

wherein, $M^1$ is a transition metal atom selected from Group 3 to Group 11 of the Periodic Table, m is an integer of 1 to 5, Q is a nitrogen atom, or a carbon atom having a substituent group $R^2$, A is an oxygen atom, a sulfur atom or a selenium atom, or a nitrogen atom having a substituent group $R^5$, $R^1$ is selected from the group consisting of;

a phenyl group having at least one atom or substituent group selected from heteroatoms and heteroatom containing groups, an aromatic hydrocarbon group other than the phenyl group, which has at least one atom or substituent group selected from heteroatoms and heteroatom-containing groups, an aliphatic hydrocarbon group having at least one atom or substituent group selected from heteroatoms and heteroatom-containing groups, and an alicyclic hydrocarbon group having at least one atom or substituent group selected from heteroatoms and heteroatom-containing groups, when $R^1$ is a phenyl group having at least one atom or substituent group selected from heteroatoms and heteroatom-containing groups and when the position of the carbon atom bonded to a nitrogen atom is defined as the 1-position, the phenyl group has at least one atom or substituent group selected from heteroatoms and heteroatom-containing groups in at least one position of the 2-position and the 6-position, or has at least one substituent group selected from a heteroatom other than a fluorine atom, a fluorine-containing group having one carbon atom and not more than two fluorine atoms, a fluorine-containing group having two or more carbon atoms, and a heteroatom-containing group having a heteroatom other than a fluorine atom, $R^2$ to $R^5$, which may be the same or different, are as defined with respect to $R^2$ to $R^5$ of the formula (II-a), and two or more of $R^2$ to $R^5$ may be bonded to form a ring, and when m is 2 or more, $R^5$s, $R^2$s, $R^3$s, $R^5$s and $R^5$s may be the same or different, and one group of $R^2$ to $R^5$ contained in one ligand and one group of $R^2$ to $R^5$ contained in other ligands may be bonded, n is a number satisfying the valence of M, and X is as defined with respect to X of the formula (I) and, when n is 2 or more, plural groups indicated by X may be the same or different, and the plural groups indicated by X may be bonded to form a ring;

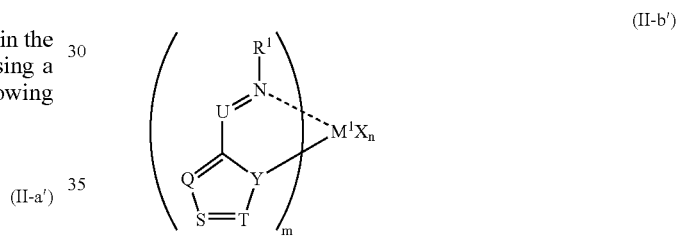

(II-b')

wherein, $M^1$ is a transition metal atom selected from Group 3 to Group 11 of the Periodic Table, m is an integer of 1 to 5, Y is a nitrogen atom or a phosphorus atom, U is a carbon atom having a substituent group $R^6$, a nitrogen atom or a phosphorous atom, Q is a carbon atom having a substituent group $R^7$, a nitrogen atom or a phosphorous atom, S is a carbon atom having a substituent group $R^8$, a nitrogen atom or a phosphorous atom, T is a carbon atom having a substituent group $R^9$, a nitrogen atom or a phosphorous atom, $R^1$ is as defined with respect to $R^1$ of the formula (II-a')

$R^6$ to $R^9$, which may be the same or different, are as defined with respect to $R^2$ to $R^5$ of the formula (II-a), and two or more of $R^6$ to $R^9$ may be bonded to form a ring, and when m is 2 or more, $R^5$s, $R^6$s, $R^7$s, $R^8$s and $R^9$s may be the same or different, and one group of $R^6$ to $R^9$ contained in one ligand and one group of $R^6$ to $R^9$ contained in other ligands may be bonded, n is a number satisfying the valence of $M^1$, and X is as defined with respect to X of the formula (I) and, when n is 2 or more, plural groups indicated by X may be the same or different, and the plural groups indicated by X may be bonded to form a ring.

Further, the olefin block copolymer can be prepared in the presence of an olefin polymerization catalyst comprising a transition metal compound represented by the following formula (III);

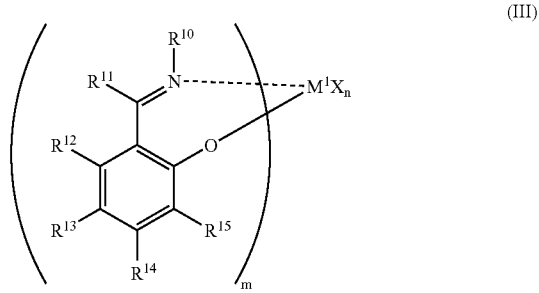

wherein, $M^1$ is a transition metal atom selected from Group 4 and Group 5 of the Periodic Table, $R^{10}$ is as defend with respect to $R^1$ of the formula (II-a'), $R^1$ to $R^{14}$, which may be the same or different, are each a hydrogen atom, a halogen atom, a halogen-containing group, a hydrocarbon group, a hydrocarbon-substituted silyl group, an oxygen-containing group, a nitrogen-containing group or a sulfur-containing group, $R^{15}$ is a halogen atom, a halogen-containing group, a hydrocarbon group or a hydrocarbon-substituted silyl group, n is a number satisfying the valence of $M^1$, and X is as defined with respect to X of the formula (I) and plural groups indicated by x may be bonded to form a ring and, when n is 2 or more, the plural groups indicated by X may be the same or different.

(Organometallic Compound (B-1))

Examples of the organometallic compound (B-1), which is optionally used in production of the olefin block copolymer, include organometallic compounds containing metals of Group 1, Group 2 and Group 13 of the Periodic Table, such as those described below.

(B-1a) Organoaluminum compounds represented by the following formula:

wherein $R^a$ and $R^b$, which may be the same or different, are each a hydrocarbon group of 1 to 15 carbon atoms, preferably 1 to 4 carbon atoms, X is a halogen atom, and m, n, p and q are numbers satisfying the conditions of $0<m\leq3$, $0\leq n<3$, $0\leq p<3$, $0\leq q<3$ and $m+n+p+q=3$.

(B-1b) Alkyl complex compounds comprising a Group-1 metal of the Periodic Table and aluminum and represented by the following formula:

wherein $M^2$ is Li, Na or K, and $R^a$ is a hydrocarbon group of 1 to 15 carbon atoms, preferably 1 to 4 carbon atoms.

(B-1c) Compounds represented by the following formula:

wherein $R^a$ and $R^b$, which may be the same or different, are each a hydrocarbon group of 1 to 15 carbon atoms, preferably 1 to 4 carbon atoms, and $M^3$ is Mg.

Also employable are compounds analogous to the organoaluminum compounds (B-1a). For example, there can be mentioned organoaluminum compounds wherein two or more aluminum compounds are bonded via a nitrogen atom, such as $(C_2H_5)_2AlN(C_2H_5)Al(C_2H_5)_2$.

Examples of the organometallic compound (B-1) further include methyllithium, ethyllithium, propyllithium, butyllithium, methylmagnesium bromide, methylmagnesium chloride, ethylmagnesium bromide, ethylmagnesium chloride, propylmagnesium bromide, propylmagnesium chloride, butylmagnesium bromide, butylmagnesium chloride, dimethylmagnesium, diethylmagnesium, dibutylmagnesium and butylethylmagnesium.

Also employable are combinations of compounds capable of forming the above-mentioned organoaluminum compounds in the polymerization system, e.g., a combination of halogenated aluminum and alkyllithium and a combination of halogenated aluminum and alkylmagnesium.

Of the organometallic compounds (B-1), the organoaluminum compounds are preferable.

The organometallic compounds (B-1) are used either individually or in combination.

(Organoaluminum Oxy-Compound (B-2))

The organoaluminum oxy-compound (B-2), which is optionally used in production of the olefin block copolymer, may be conventional aluminoxane (otherwise called alumoxane) or such a benzene-insoluble organoaluminum oxy-compound as exemplified in JP-A-2(1990)/78687.

(Compound that Reacts with the Transition Metal Compound (A) to Form ion Pair (B-3))

Examples of the compound (B-3), which is optionally used in preparation of the olefin block copolymer, that reacts with the transition metal compound (A) to form an ion pair, include the Lewis acids, the ionic compounds, the borane compounds and the carborane compounds as described in JP-A-1(1989)/501950, JP-A-1(1989)/502036, JP-A-3 (1991)/179005, JP-A-3(1991)/179006, JP-A-3(1991)/207703 and JP-A-3(1991)/207704, and U.S. Pat. No. 5,321,106. Heteropoly compounds and isopoly compounds may also be employed.

The olefin polymerization catalyst used in the invention can contain, according to necessity, the following carrier (C) and/or the later-mentioned organic compound (D) in addition to the transition metal compound (A) and at least one compound (B) (sometimes referred to as "component (B)" hereinafter) selected from the organometallic compound (B-1), the organoaluminum oxy-compound (B-2) and the ionizing ionic compound (B-3).

(Carrier(C))

The carrier (C) optionally used in the present invention is an inorganic or organic compound and a granular or fine particle solid.

The inorganic compound is preferably a porous oxide, inorganic halide, clay, clay mineral or ion exchange layered compound.

(Organic Compound Component(D))

In the present invention, the organic compound component (D) is optionally used to improve the polymerization performance and the physical properties of resulting polymers. Examples of the organic compound may include alcohols, phenolic compounds, carboxylic acids, phosphrus compounds and sulfonates.

In polymerization, the method of using each of the components and the order of adding the components are selected arbitrarily. For example, the following methods are exemplified.

(1) A method of adding the transition metal compound (A) singly to a polymerization reactor.
(2) A method of adding the transition metal compound (A) and the component (B) to a polymerization reactor in an arbitrary order.
(3) A method of adding a catalyst component supporting the transition metal compound (A) on the carrier (C), and the component (B) to a polymerization reactor in an arbitrary order.
(4) A method of adding a catalyst component supporting the component (B) on the carrier (C), and the transition metal compound (A) to a polymerization reactor in an arbitrary order.
(5) A method of adding a catalyst component supporting the transition metal compound (A) and the component (B) on the carrier (C) to a polymerization reactor.

In the methods (2) to (5), at least two of the catalyst components may be contacted previously.

In the methods (4) and (5) where the component (B) is supported, the component (B) unsupported may be added optionally in an arbitrary order. In the methods, the components (B) may be the same as or different from each other.

The solid catalyst component supporting the transition metal compound (A) on the component (C), and the solid catalyst component supporting the transition metal compound (A) and the component (B) on the component (C) may be prepolymerized with an olefin, and further, a catalyst component may be supported on the prepolymerized solid catalyst component.

The olefin block copolymer can be prepared by synthesizing plural polymer blocks in the presence of the olefin polymerization catalyst as described above through the following step (1), the step (2) and optionally the step (3) in arbitrary times.

In the step (1), ethylene and at least one olefin selected from α-olefins of 3 to 20 carbon atoms are polymerized in the presence of the olefin polymerization catalyst to prepare a polymer block.

Examples of the olefins of 3 to 20 carbon atoms may include the same as described above, and these may be used individually or in combination.

In the step (1), the polymerization temperature is usually from −40 to +200° C., preferably 0 to +150° C. The polymerization pressure is usually from atmospheric pressure to 100 kg/cm$^2$ (9.8 Mpa), preferably atmospheric pressure to 50 kg/cm$^2$ (4.9 Mpa).

In the step (2), ethylene and at least one olefin selected from olefins of 3 to 20 carbon atoms are polymerized in the presence of the polymer block prepared in the step (1) to prepare a polymer block different from the above polymer block.

Examples of the olefins of 3 to 20 carbon atoms may include the same as above, and these may be used individually or in combination. Further, examples of the polymer block prepared in the step (2) may include the same as above.

In the step (2), the polymerization temperature is usually from −40 to +200° C., preferably 0 to +150° C. The polymerization pressure is usually from atmospheric pressure to 100 kg/cm$^2$ (9.8 Mpa), preferably atmospheric pressure to 50 kg/cm$^2$ (4.9 Mpa).

In the step (3), at least one olefin selected from olefins of 2 to 20 carbon atoms is polymerized in the presence of a block copolymer comprising the polymer block prepared in the step (1) and the polymer block prepared in the step (2) to prepare a polymer block different from the polymer blocks prepared in the previous steps.

Examples of the olefins of 2 to 20 carbon atoms may include the same as above, and these may be used individually or in combination. Further, examples of the polymer block prepared in the step (3) may include the same as above.

In the step (3), the polymerization temperature is usually from −40 to +200° C., preferably 0 to +150° C. The polymerization pressure is usually from atmospheric pressure to 100 kg/cm$^2$ (9.8 Mpa), preferably atmospheric pressure to 50 kg/cm$^2$ (4.9 Mpa).

The step (3) may be carried out in arbitrary times by varying the kind of olefins, the combination thereof or polymerization conditions.

In the present invention, polymerization can be carried out by any of liquid phase polymerizations such as solution polymerization, solvent slurry polymerization or the like, or gas phase polymerizations.

Examples of an inert hydrocarbon mediums used in the liquid phase polymerization may include aliphatic hydrocarbons such as propane, butane, pentane, hexane, heptane, octane, decane, dodecane, kerosene, etc; alicyclic hydrocarbons such as cyclopentane, cyclohexane, methylcyclopentane, etc; aromatic hydrocarbons such as benzene, toluene, xylene, etc; halogenated hydrocarbons such as ethylene chloride, chlorobenzene, dichloromethane, etc; and mixtures thereof. Further, the olefin itself may be used as a solvent.

In the polymerization of ethylene and an α-olefin having 3 to 20 carbon atoms by using the above olefin polymerization catalyst, the transition metal compound (A) is used in an amount of usually $10^{-12}$ to 1 mol, preferably $10^{-10}$ to $10^{-2}$ mol per 1 liter of the reaction volume.

In the case of using the component (B-1), the component (B-1) is used in such an amount that the molar ratio [(B-1)/M] of the component (B-1) to transition metal atom (M) in the transition metal compound (A) is usually from 0.01 to 100,000, preferably 0.05 to 50,000.

In the case of using the component (B-2), the component (B-2) is used in such an amount that the molar ratio [(B-2)/M] of aluminum atom in the component (B-2) to transition metal atom (M) in the transition metal compound (A) is usually from 10 to 500,000, preferably 20 to 100,000.

In the case of using the component (B-3), the component (B-3) is used in such an amount that the molar ratio [(B-3)/M] of the component (B-3) to transition metal atom (M) in the transition metal compound (A) is usually from 1 to 10, preferably 1 to 5.

In the case of using the component (D), when the component (B) is the component (B-1), the component (D) is used in such an amount that the molar ratio ((D)/(B-1)] is usually from 0.01 to 10, preferably 0.1 to 5. When the component (B) is the component (B-2), the component (D) is used in such an amount that the molar ratio [(D)/(B-2)] is usually from 0.001 to 2, preferably 0.005 to 1. When the component (B) is the component (B-3), the component (D) is used in such an amount that the molar ratio [(D)/(B-3)] is usually from 0.01 to 10, preferably 0.1 to 5.

The molecular weight of the resulting olefin block copolymer can be regulated by controlling the ratio of monomer to catalyst or polymerization time.

The olefin block copolymers as described above are suitably used as a viscosity index improver for lubricating oils.

(Lubricating Oil Composition)

The lubricating oil composition of the present invention comprises the viscosity index improver of the above olefin block copolymers and a lubricating oil base material and optionally a pour point depressing agent.

Firstly, each of the components forming the lubricating oil composition of the present invention will be described.

(Lubricating Oil Base Material)

Examples of the lubricating oil base material used in the present invention may include mineral oils; poly-α-olefins; di-esters such as polyol esters, dioctyl phthalate, dioctyl sebacate, etc; and synthetic oils such as polyalkylene glycol, etc. It is preferred to use mineral oil or a blend of the mineral oil and synthetic oil.

The mineral oils are generally used by way of purification steps such as dewaxing, etc and classified into several classes by purification methods. In general, mineral oils containing 0.5 to 10% wax components are used. For example, it is possible to use highly purified oil, which is prepared by a hydrocracking purification method, having a low pour point, a high viscosity index and a composition mainly comprising isoparaffin. Further, it is general to use mineral oil having a kinematic viscosity at 40° C. of from 10 to 200 cSt.

(Pour Point Depressing Agent)

The pour point depressing agents optionally used in the present invention are alkylated naphthalene, (co) polymers of alkyl methacrylate, (co) polymers of alkyl acrylate, a copolymer of alkyl fumarate and vinyl acetate, α-olefin polymers and copolymers of α-olefin and styrene, etc. Among them, it is suitable to use (co)polymers of alkyl methacrylate and (co)polymers of alkyl acrylate.

(Composition)

The lubricating oil composition of the present invention comprises the above lubricating oil base material, the above olefin block copolymer and optionally the pour point depressing agent.

The lubricating oil composition which comprises the lubricating oil base material and the olefin block copolymer, desirably contains the olefin polymer in an amount of 1 to 20% by weight, preferably 5 to 10% by weight. The residual components are the lubricating oil base material and compounding agents as described later.

The lubricating oil composition has excellent low temperature properties and excellent shear stability.

The lubricating oil composition can be submitted to use for lubricating oils as it is, or it is blended with the pour point depressing agent, etc and can be submitted to the use.

The lubricating oil composition, which comprises the lubricating oil base material, the olefin block copolymer and the pour point depressing agent, desirably contains the olefin polymer in an amount of 0.1 to 5% by weight, preferably 0.2 to 1.5% by weight, more preferably 0.25 to 1.5% by weight, furthermore preferably 0.30 to 1.5% by weight, and optionally the pour point depressing agent in an amount of 0.05 to 3% by weight, preferably 0.1 to 3% by weight, more preferably 0.1 to 2% by weight, most preferably 0.2 to 1.5% by weight. The residual components are the lubricating oil base material and compounding agents as described later.

When the lubricating oil composition contains the amount of the olefin polymer in the above ranges, the shear stability of the composition can be improved.

The lubricating oil composition of the present invention may contain compounding agents having viscosity index improving properties such as (co)polymers of alkyl methacrylate, hydrogenated SBER, SEBS, etc and compounding agent such as detergents, rust preventive additives, dispersants, extreme pressure agents, antifoaming agents, antioxidants, metal deactivators, hard wearing agents etc in addition to the lubricating oil base material, the olefin polymer and the pour point depressing agent.

Examples of the extreme pressure agents may include sulfur exteme pressure agents such as sulfide groups, sulfoxide groups, sulfone groups, thiophosphinate groups, thiocarbonate groups, fat sulfides and oil silfides, olefin sulfides, etc; phosphoric acid groups such as phosphate, phosphite, amine phosphate, amine phosphite; and halogen compounds such as chlorinated hydrocarbons etc.

Examples of the hard wearing agents may include inorganic and organic molybdenum compounds such as molybdenum disulfide, etc, organic boron compounds such as alkyl mercaptyl borate, graphite, antimony sulfide, boron compounds, polytetrafluoro ethylene etc.

Examples of the detergent and dispersants may include metal sulfonates such as calcium sulfonate, magnesium sulfonate, barium sulfonate, etc, thiophosphonates, phenates, salicylates, succinimides, benzyl amine, succinates, etc.

Examples of the antioxidants may include amine compounds such as 2,6-di-tert-butyl-4-methylphenol etc, sulfur or phosphorus compounds such as zinc dithiophosphate etc.

Examples of the rust preventive agents may include carboxylic acids and salts thereof such as oxalic acid etc; sulfonates; esters; alcohols; phosphoric acids and salts thereof; benzotriazoles and derivatives thereof; and thiazole compounds.

Examples of the antifoaming agents may include silicone compounds such as dimethyl siloxane, silica gel dispersion, etc, and alcohol or ester compounds.

The amount of these additives added varies in accordance with desired lubricating properties. These additives may be contained in an amount of usually 0.01 to 50 parts by weight, preferably 0.05 to 30 parts by weight in 100 parts by weight of the above lubricating oil composition.

The lubricating oil composition of the present invention can be prepared by mixing or dissolving, in the lubricating oil base material, the olefin polymer and optionally the pour point depressing agent and further optionally other compounding agents with conventionally known methods.

EFFECT OF THE INVENTION

The olefin block copolymer of the present invention can prepare a viscosity index improver for lubricating oils capable of preparing a lubricating oil composition having excellent low temperature properties, excellent balance between viscosity and shear stability.

Using the viscosity index improver for lubricating oils according to the invention, the lubricating oil composition having low temperature properties and excellent balance between viscosity and shear stability can be prepared.

The lubricating oil composition of the present invention has excellent low temperature properties and excellent balance between viscosity and shear stability.

EXAMPLE

The present invention is further described in more detail with reference to the following examples. The examples should not be construed as limiting the scope of the invention.

In the examples, the various physical properties were measured in the following manner.

(Composition of Block Copolymer)

The composition of a block copolymer was measured in a mixed solvent of ortho-dichlorobenzene and benzene-d6 (the volume ratio of ortho-dichlorobenzene to benzene-d6 is from 3/1 to 4/1) at 120° C., at a pulse width of 45° pulse, at a pulse repeating time of 5.5 sec using a LA 500 nuclear magnetic resonance apparatus manufactured by JEOL Ltd.

(viscosity at 100° C.)

The viscosity at 100° C. was measured based on ASTM D 445. In the examples, the kinematic viscosity (K.V.) was regulated to be about 10 mm$^2$/sec.

(Cold Cranking Simulator (CCS))

The measurement was conducted based on ASTM D 2602. The CCS was used for evaluation of sliding properties at low temperatures (starting properties) at a crank axis. The CCS indicates the fact that the smaller the value is, the better the low temperature properties of the lubricating oil are.

(Mini-Rotary Viscometer (MRV))

The measurement was conducted based on ASTM D 3829 and D4684. The MRV was used for evaluation of pumping of an oil pump at low temperatures. The MRV indicates the fact that the smaller the value is, the better the low temperature properties of the lubricating oil are.

(Shear Stability Index (SSI))

The measurement was conducted based on ASTM D 3945. The SSI is a measure of loss of a kinematic viscosity caused by breakage of molecular chains when the copolymer components in the lubricating oil has undergone a shear force under sliding. The SSI indicates the fact that the larger the value is, the larger the loss of the kinematic viscosity is.

(Low Temperature Fluidity (Low Temperature Storage Stability))

After cooling at −18° C. for 2 weeks, the fluidity (appearance) was observed and evaluated as follows.

AA: fluidity
BB: gelation

Polymerization Example 1

To a 500 ml glass autoclave thoroughly purged with nitrogen, 250 ml of dried toluene was fed and propylene was passed through at a rate of 100 l/h for 40 min. Thereafter while the temperature of the autoclave was kept at 25° C., 5.00 mmol in terms of aluminum of methyl aluminoxane was added to the autoclave. Successively, 0.05 mmol of bis[N-(3-t-butyl salicylidene)-2,3,4,5,6-penta-fluoroanilinato] titanium(IV) dichloride was added as a catalyst, and simultaneously a mixed gas of ethylene and propylene at a rate of 3 1/30 l per hour was passed through and the stirring was conducted for 60 min. Then the reaction was stopped by adding 20 ml of isobutyl alcohol. To the reaction mixture, 10 ml of 1 N hydrochloric acid was added and stirred for 30 min under a stream of nitrogen. Thereafter, the polymerization solution was poured into a 1.5 l of methanol to precipitate a polymer. The polymer slurry was stirred with a magnetic stirrer over night and the polymer was collected with a fritted glass filter. The polymer was dried at 130° C. for 10 hr under reduced pressure to obtain 2.52 g of an ethylene/propylene copolymer. As the result of GPC analysis, the polymer had a Mw of 106000 and Mw/Mn in terms of polystyrene of 1.14. It had an ethylene content as determined by IR analysis of 49.5 mol %.

Polymerization Example 2

To a 500 ml glass autoclave thoroughly purged with nitrogen, 250 ml of dried toluene was fed and propylene was passed through at a rate of 100 l/h for 40 min. Thereafter while the temperature of the autoclave was kept at 25° C., 5.00 mmol in terms of aluminum of methyl aluminoxane was added to the autoclave. Successively, 0.05 mmol of bis[N-(3-t-butyl salicylidene)-2,3,4,5,6-penta-fluoroanilinato]titanium(IV) dichloride was added as a catalyst, and simultaneously a mixed gas of ethylene and propylene at a rate of 3 1/30 l per hour was passed through and the stirring was conducted for 50 min. The procedure to this point was carried out in the same manner as in Polymerization Example 1 and then the mixed gas composition was changed to 70 1/30 l per hour and the stirring was further conducted for 3.5 min without stopping of the reaction. After the stirring, the reaction was stopped by adding 20 ml of isobutyl alcohol. To the reaction mixture, 10 ml of 1 N hydrochloric acid was added and stirred for 30 min under a stream of nitrogen. Thereafter, the polymerization solution was poured into a 1.5 l of methanol to precipitate a polymer. The polymer slurry was stirred with a magnetic stirrer over night and the polymer was collected with a fritted glass filter. The polymer was dried at 130° C. for 10 hr under reduced pressure to obtain 4.33 g of a block polymer. As the result of GPC analysis, the polymer had a Mw of 182000 and Mw/Mn in terms of polystyrene of 1.15. It had an ethylene content as determined by IR analysis of 63.6 mol %. The results are shown in Table 1.

TABLE 1

|  |  | Polymerization Example 2 |
|---|---|---|
| Total | Ethylene content (mol %) | 63.6 |
|  | Mw (in terms of PS) | $18.2 \times 10^4$ |
|  | Mw/Mn | 1.2 |
|  | CD gradient | — |
| Component 1 | Ethylene content (mol %) | 49.5 |
|  | Mw (in terms of PS) | $10.6 \times 10^4$ |
|  | CD gradient | 0.05 |
| Component 2 | Ethylene content (mol %) | 80.8 |
|  | Mw (in terms of PS) | $7.6 \times 10^4$ |
|  | CD gradient | 0.05 |

Example 1

A lubricating oil was prepared using 87.62% by weight of mineral oil 150 neutral (manufactured by ESSO Co.) as base oil, 0.88% by weight of a polymer prepared in Polymerization Example 2 as a viscosity index improver, 0.5% by weight of ACLUB 133 (manufactured by Sanyo Chemical Industries) as a pour point depressing agent and 11.0% by weight of a detergent and dispersant (manufactured by Lubrizol Co.), and then the properties of the lubricating oil and the fluidity at low temperatures thereof were evaluated.

The results are shown in Table 2.

TABLE 2

| Polymer for blending | Example 1 Polymerization Example 2 |
|---|---|
| Blending (wt %) |  |
| Base oil | 87.62 |
| Detergent and dispersant | 11.0 |
| Pour point depressing agent | 0.5 |
| Polymer | 0.88 |

TABLE 2-continued

| Polymer for blending | Example 1 Polymerization Example 2 |
|---|---|
| Lubricating oil properties | |
| Kinematic viscosity at 100° C. (mm²/s) | 14.88 |
| SSI | 28 |
| CCS viscosity at −20° C. (mPa · s) | 3,350 |
| MR viscosity at −30° C. (mPa · s) | 35,500 |
| Low temperature fluidity | AA |

Polymerization Examples 3 and 4

Polymers were prepared by polymerization in such manners as described in Examples 3B and 3A in JP-B-6(1994)/96624. The resulting polymers had the properties as shown in Table 3.

Comparative Examples 2 and 3

In each example, lubricating oil comprising the polymer prepared in Polymerization Example 3 or 4 was prepared in the same manner as in Example 1. The properties of the lubricating oil are shown in Table 4.

TABLE 3

| | | Polymerization Example | |
|---|---|---|---|
| | | 3 | 4 |
| Total | Ethylene content (mol %) | 55.5 | 59.0–41.3 |
| | Mw (in terms of PS) | 130,000 | 10,000 |
| | Mw/Mn | 1.2 | 1.2 |
| | CD gradient | 0.11 | 0.17 |

TABLE 4

| Polymer for blending | Comparative Example 2 Polymerization Example 3 | Comparative Example 3 Polymerization Example 4 |
|---|---|---|
| Blending (wt %) | | |
| Base oil | 87.25 | 87.1 |
| Detergent and dispersant | 11.0 | 11.0 |
| Pour point depressing agent | 0.5 | 0.5 |
| Polymer | 1.25 | 1.4 |
| Lubricating oil properties | | |
| Kinematic viscosity at 100° C. (mm²/s) | 14.82 | 14.90 |
| SSI | 19 | 16 |
| CCS viscosity at −20° C. (mPa · s) | 3,450 | 3,510 |
| MR viscosity at −30° C. (mPa · s) | 41,200 | 42,400 |
| Low temperature fluidity | AA | AA |

Polymerization Examples 5 to 9

Polymers were prepared by regulating polymerization time and a gas composition in the same manner as in Polymerization Example 1. The resulting polymers bad the properties as shown in Table 5.

Comparative Examples 4 to 8

In each example, lubricating oil comprising the polymer prepared in each of Polymerization Example 5 to 9 was prepared in the same manner as in Example 1. The properties of the lubricating oil are shown in Table 6.

TABLE 5

| | Polymerization Example | | | | |
|---|---|---|---|---|---|
| | 5 | 6 | 7 | 8 | 9 |
| Ethylene content (mol %) | 49.5 | 49.5 | 80.8 | 80.8 | 63.4 |
| Mw (in terms of PS) | 182,000 | 106,000 | 164,000 | 76,000 | 182,000 |
| Mw/Mn | 1.2 | 1.2 | 1.2 | 1.2 | 1.2 |
| CD gradient | 0.04 | 0.04 | 0.04 | 0.04 | 0.04 |

TABLE 6

| | Comparative Example | | | | |
|---|---|---|---|---|---|
| | 4 | 5 | 6 | 7 | 8 |
| Polymer for blending | Polymerization Example | | | | |
| | 5 | 6 | 7 | 8 | 9 |
| Blending (wt %) | | | | | |
| Base oil | 87.50 | 87.10 | 87.51 | 86.95 | 87.52 |
| Detergent and dispersant | 11 | 11 | 11 | 11 | 11 |
| Pour point depressing agent | 0.5 | 0.5 | 0.5 | 0.5 | 0.5 |
| Polymer | 1 | 1.4 | 0.99 | 1.55 | 0.98 |
| Lubricating oil properties | | | | | |
| Kinematic viscosity at 100° C. (mm²/s) | 14.91 | 14.88 | 14.72 | 14.90 | 14.95 |
| SSI | 30 | 21 | 26 | 17 | 29 |
| CCS viscosity at −20° C. (mPa · s) | 3,450 | 3,500 | 3,080 | 3,180 | 3,380 |
| MR viscosity at −30° C. (mPa · s) | 40,500 | 41,800 | 23,800 | 24,100 | 47,500 |
| Low temperature fluidity | AA | AA | BB | BB | BB |

Comparative Examples 9 to 11

In each example, the polymers prepared in Polymerization Examples 5 to 8 were blended as shown in Table 7 to prepare lubricating oil. The properties of the lubricating oil are shown in Table 7.

TABLE 7

|  | Comparative Example | | |
|---|---|---|---|
|  | 9 | 10 | 11 |
| Polymer for blending (weight ratio) | | | |
| Polymerization Example 5 | 50 | | 50 |
| Polymerization Example 6 | | 50 | |
| Polymerization Example 7 | 50 | | |
| Polymerization Example 8 | | 50 | 50 |
| Blending (wt %) | | | |
| Base oil | 87.5 | 87 | 87.2 |
| Detergent and dispersant | 11 | 11 | 11 |
| Pour point depressing agent | 0.5 | 0.5 | 0.5 |
| Polymer | 1 | 1.5 | 1.3 |
| Lubricating oil properties | | | |
| Kinematic viscosity at 100° C. (mm²/s) | 15.01 | 14.95 | 14.90 |
| SSI | 28 | 19 | 27 |
| CCS viscosity at −20° C. (mPa · s) | 3,260 | 3,360 | 3,320 |
| MR viscosity at −30° C. (mPa · s) | 36,000 | 36,600 | 36,100 |
| Low temperature fluidity | BB | AA | AA |

Comparative Examples 12 to 13

NDG12 and 701204095 of the polymer ID were prepared based on the description in Example 4 of National Publication of International Patent 2002-507225.

The properties of the polymer are shown in Table 8 and the properties of the lubricating oil as determined the same with Example 1 are shown in Table 9, respectively.

TABLE 8

|  |  | Comparative Example 12 (NDG12) | Comparative Example 13 (701204095) |
|---|---|---|---|
| Total | Ethylene content (mol %) | 77 | 78.6 |
|  | Mw (in terms of PS) | 9.8 × 10³ | 9.8 × 10³ |
|  | Mw/Mn | 1.42 | 1.6 |
| Component 1 | Ethylene content (mol %) | 71.3 | 82.1 |
|  | Mw (in terms of PS) | 1.9 × 10³ | 1.5 × 10³ |
| Component 2 | Ethylene content (mol %) | 97.5 | 98.3 |
|  | Mw (in terms of PS) | 7.9 × 10³ | 8.3 × 10³ |

TABLE 9

|  | Comparative Example 12 NDG12 | Comparative Example 13 701204095 |
|---|---|---|
| Polymer for blending | | |
| Blending (wt %) | | |
| Base oil | 87.4 | 87.3 |
| Detergent and dispersant | 11 | 11 |
| Pour point depressing agent | 0.5 | 0.5 |
| Polymer | 1.12 | 1.2 |
| Lubricating oil properties | | |
| Kinematic viscosity at 100° C. (mm²/s) | 14.88 | 14.92 |
| SSI | 17 | 23 |
| CCS viscosity at −20° C. (mPa · s) | 3,380 | 3,400 |
| MR viscosity at −30° C. (mPa · s) | 39,200 | 37,100 |
| Low temperature fluidity | BB | BB |

What is claimed is:

1. An olefin block copolymer having a Mw/Mn (Mw: weight average molecular weight, Mn: number average molecular weight) of not more than 1.5, which copolymer comprises.
   (i) a polymer block comprising ethylene and an α-olefin of 3 to 20 carbon atoms, having a molar ratio (ethylene/α-olefin) of ethylene units to α-olefin units of from 20/80 to 65/35, a weight average molecular weight of 50,000 to 2,000,000, and having a slope of an intramolecular composition distribution of absolute value of 0.1 to 0, and
   (ii) a polymer block comprising ethylene and an α-olefin of 3 to 20 carbon atoms, having a molar ratio (ethylene/α-olefin) of ethylene units to α-olefin units of from 70/30 to 85/15, a weight average molecular weight of 10,000 to 400,000, and having a slope of an intramolecular composition distribution of absolute value of 0.1 to 0.

2. A viscosity index improver for lubricating oils which improver comprises an olefin block copolymer as claimed in claim 1.

3. A lubricating oil composition comprising a viscosity index improver for lubricating oils as claimed in claim 2.

* * * * *